United States Patent [19]
Carnevale et al.

[11] 4,412,722
[45] Nov. 1, 1983

[54] SINGLE MODE FIBER WITH GRADED INDEX OF REFRACTION

[75] Inventors: Anthony Carnevale, Warren; Un-Chul Paek, West Windsor Township, Mercer County; George E. Peterson, Warren, all of N.J.

[73] Assignees: Western Electric, New York, N.Y.; Bell Telephone Laboratories Incorporated, Murray Hill, N.J.

[21] Appl. No.: 315,020

[22] Filed: Oct. 26, 1981

[51] Int. Cl.$^3$ .............................. G02B 5/172
[52] U.S. Cl. .................................. 350/96.31
[58] Field of Search ............... 350/96.29, 96.30, 96.31, 350/96.33, 96.34

[56] References Cited

U.S. PATENT DOCUMENTS

| | | | |
|---|---|---|---|
| Re. 28,029 | 6/1974 | Keck et al. | 65/3.12 |
| 3,711,262 | 1/1973 | Keck et al. | 65/3.12 |
| 3,823,997 | 7/1974 | Gloge et al. | 350/96.31 |
| 3,966,446 | 6/1976 | Miller | 65/2 |
| 4,089,586 | 5/1978 | French et al. | 350/96.3 |
| 4,135,901 | 1/1979 | Fujiwara et al. | 65/2 |
| 4,205,901 | 6/1980 | Ramsay et al. | 350/96.31 |
| 4,217,027 | 8/1980 | MacChesney et al. | 350/96.3 |
| 4,224,046 | 9/1980 | Izawa et al. | 65/3.12 |
| 4,300,930 | 11/1981 | Chang | 350/96.3 X |

FOREIGN PATENT DOCUMENTS

27223 4/1981 European Pat. Off. ........... 350/96.3

OTHER PUBLICATIONS

Niizeki, "Single Mode Fiber at Zero-Dispersion Wavelength," *Topical Mtg. on Int. & Guided Wave Optics* (Salt Lake City), Jan. 1978, pp. MB1-1 to 4.

White et al., "Zero Total Dispersion in Step-Index Monomode Fibres at 1.30 and 1.55 μm", *Elect. Lett.*, vol. 15, No. 13, Jun. 1979, pp. 396-397.

W. A. Gambling, D. N. Payne and H. Matsumura, "Cut-Off Frequency in Radially Inhomogeneous Single-Mode Fibre," Electronics Letters, vol. 13, No. 5, Mar. 3, 1977, pp. 139-140.

S. Kawakami, S. Nishida and M. Sumi, "Transmission Characteristics of W-type Optical Fibres," Proc. IEE, vol. 123, No. 6, Jun. 1976, pp. 586-590.

W. A. Gambling, H. Matsumara and C. M. Ragdale, "Zero Total Dispersion in Graded-Index Single-Mode Fibres," Electronics Letters, vol. 15, No. 15, Jul. 19, 1979, pp. 474-476.

A. W. Snyder and R. A. Sammut, "Dispersion in Graded Single-Mode Fibres," Electronics Letters, vol. 15, No. 10, May 10, 1979, pp. 269-271.

G. E. Peterson, A. Carnevale, U. C. Paek and D. W. Berreman, "An Exact Numerical Solution to Maxwell's Equations for Lightguides," The Bell System Technical Journal, vol. 59, No. 7, Sep. 1980, pp. 1175-1196.

K. C. Kao and G. A. Hockham, "Dielectric-Fibre Surface Waveguides for Optical Frequencies," Proc. IEE, vol. 113, No. 7, Jul. 1966, pp. 1151-1158.

U. C. Paek, G. E. Peterson and A. Carnevale, "Dispersionless Single-Mode Lightguides with α Index Profiles," The Bell System Technical Journal, vol. 60, No. 5, May-Jun. 1981, pp. 583-598.

*Primary Examiner*—John D. Lee
*Attorney, Agent, or Firm*—Samuel H. Dworetsky; Eugen E. Pacher

[57] ABSTRACT

This invention involves optical fiber which supports essentially only a single guided mode, perhaps degenerate, at the transmission wavelength, usually between 0.6 and 1.7 microns. The index of refraction of the core material is graded in the radial direction so as to yield an optical fiber with very low total dispersion and therefore high bandwidth. Specific embodiments include, in addition to the low dispersion characteristic, improved field confinement, and therefore permit lower clad-to-core ratios then heretofore believed practical. Additional advantages which accrue as a result of the greater field confinement include lower cabling, microbending, and curvature-induced losses.

9 Claims, 10 Drawing Figures

SINGLE MODE FIBER WITH GRADED INDEX OF REFRACTION

BACKGROUND OF THE INVENTION

1. Field of the Invention

This invention involves optical fiber which supports essentially only a single guided mode, perhaps degenerate, at the transmission wavelength, usually between 0.6 and 1.7 microns. The index of refraction of the core material is graded in the radial direction so as to yield an optical fiber with very low total dispersion and therefore high bandwidth.

2. Description of the Prior Art

Since the work of Maxwell in the late nineteenth century, elucidating the electromagnetic wave nature of light, it has been known that electromagnetic radiation in the optical region of the spectrum is inherently capable of transmitting more information than electromagnetic radiation in lower frequency (higher wavelength) regions of the spectrum. Clearly, optical radiation, for the purposes of this application referring generally to electromagnetic radiation in the region of the spectrum between 0.6 and 1.7 microns, is likewise capable of carrying more information than electrical impulses transmitted through copper wire. Despite the many years since the recognition of the information carrying capabilities of light, commercial optical communication systems have not been developed, due primarily to lack of a sufficiently low loss transmission medium.

In the mid-1960's, it was suggested by Kao and Hockham (*Proceedings of IEE*, Vol. 113, No. 7, July 1966, page 1151) that pure silica would be able to transmit light in the optical region of the electromagnetic spectrum with losses less than 20 dB/km, a value viewed by many as representing the onset of commercial, economic viability. Hence silica would constitute the long searched-for low loss optical transmission medium.

In the early 1970's, a number of manufacturing techniques were developed to form silica based fibers of loss less than 20 dB/km. Such processes depended, by and large, upon the formation of silica-based glass from appropriate glass precursor vapors. Processes include the Bell System MCVD process (U.S. Pat. No. 4,217,027), the Corning soot process (U.S. Pat. Nos. 3,711,262, Re. 28,029), and the VAD process (U.S. Pat. Nos. 3,966,446, 4,135,901, 4,224,046) pursued, among others, by a number of Japanese companies. As a result of these developments, optical fibers are now routinely fabricated in commercial processes with losses less than 2 dB/km in the optical region of the spectrum.

While losses associated with optical fibers have been reduced, such reduction is due primarily to the selection of appropriate material systems and to the use of appropriate fabrication processes. Added losses due to cabling, or induced by curvature, microbending, or splicing, continue to be of some concern, especially when ultra-low loss fibers (less than 1 dB/km) are considered.

Despite the continuing concern with fiber loss, fiber characteristics have reached the point where repeater spacing is in many instances limited, not by the loss characteristics of the fiber, but rather by the bandwidth characteristics of the fiber. Repeaters are required where the optical signal is well above detectable levels, since the individual pulses have reached a point where they overlap sufficiently to result in bandwidth degradation.

To understand the bandwidth limitation of optical fibers it should be remembered that, originally, fibers were constructed primarily with parameters appropriate to the support of numerous propagating modes within a single fiber, hence the term "multimode fibers." Different propagation velocities, associated with each of these modes, result in dispersion, commonly referred to as mode dispersion, which affects the bandwidth of the fiber deleteriously. Early in the development of optical fibers, it was appreciated radial gradations in the index of refraction resulted in lowered mode dispersion and improved bandwidth of multi-mode fibers.

Despite the increased bandwidth obtained when multi-mode fibers are appropriately graded in index of refraction in the radial direction, bandwidths in excess of 500 megahertz-kilometer could not be readily obtained using commercially viable fabrication processes. This failure to obtain ultra-high bandwidth using multi-mode fiber led to a concentration of research effort on single-mode fibers, which, it was known, could theoretically have bandwidths in the gigahertz-kilometer region. Although such high bandwidths had been predicted early in the theoretical study of optical fibers, commercially viable fabrication processes had not been developed to realize this, as yet theoretical, high bandwidth.

Initial fabrication of single-mode fibers involved a step index structure in which the core was primarily of a uniform index of refraction and the cladding was primarily of a uniform lower index of refraction. Early fibers comprised silica cores with downdoped claddings of, for example, borosilicate and later fluorosilicate. Later fibers included undoped cores of, for example, germania silicate and silica claddings. However, both of these designs were impractical from a manufacturing standpoint due to the high temperatures necessary to process deposited pure silica. Distortion in the fiber due to these high temperatures in the manufacturing process led away from the use of pure silica in step index single-mode fibers. Later fibers included germania silicate cores and phosphosilicate claddings. Phosphorus in the cladding simplifies the manufacturing process insofar as it lowers the melting temperature of silica and acts as a fining agent. Furthermore, the removal of boron from the fiber, whose presence likewise simplifies manufacturing due to lowered melting temperatures, avoids the relatively low wavelength infrared absorption edge associated with borosilicate glasses.

Recent developments have centered about the manufacture of ever higher bandwidth single-mode fibers. The pursuit of such low dispersion designs has led to the realization that material dispersion was not the only significant consideration in designing high bandwidth fibers, but waveguide dispersion must likewise be taken in to account. Waveguide dispersion is associated with the specific field configurations of the electromagnetic radiation within the fiber. Field configurations, for example, which result in significant transmission of power near the core-clad interface will have different dispersive characteristics than field configurations which result in significant transmission of power near the fiber core. Waveguide dispersion varies with the physical characteristics of the fiber, such as core radius, and with material characteristics such as $\Delta$, the relative index difference, $\alpha$ the index profile, N the absolute index value and with $\lambda$ the transmission wavelength. For given fiber parameters there are regions of the spectrum where the waveguide dispersion is of opposite sign that the material dispersion. Therefore fibers may be designed so that the waveguide and material dispersion will cancel, yielding essentially zero dispersion along a narrow range of wavelengths (W. A. Gambling et al., *Electronics Letters,* Vol. 15, No. 15, July 19, 1979, page 475).

The high bandwidth, zero total dispersion characteristics which are obtained by offsetting material dispersion against waveguide dispersion and which yield desirably high information transmission rates, may be obtained over a relatively wide spectral range by appropriate selection of index profile in both core and cladding. Fibers of the future, which may include frequency multiplexing, namely, the transmission of information at a number of different frequencies simultaneously, must be designed with high bandwidths at all of the frequencies envisioned for future transmission. Appropriate index profiles which yield bandwidth characteristics that meet this need include "w type" fibers. (See, for example, S. Kawakami et al., *Proceedings of IEE,* Vol. 123, No. 6, June 1976, page 586.) Such fibers, sometimes referred to as doubly clad single-mode fibers, include a core region adjacent to a first cladding region of index of refraction lower than the core, surrounded by a second cladding region with an index of refraction intermediate between the core and the first cladding region. It is found that such w type fibers may be designed with low dispersion over a relatively extended range of wavelengths.

While the above discussion of single-mode fibers has been in terms of the step index design, it was early realized that due to manufacturing limitations, it was rarely, if ever, possible to produce an ideal step-index single-mode fiber. Early studies showed, for example, that inhomogeneity in the index of refraction of the core, due to diffusion effects which could not be totally avoided during manufacture, resulted in shifted cutoff frequencies, i.e., that frequency below which only a single mode is transmitted in the core. (See, for example, W. A. Gambling et al., *Electronics Letters,* Vol. 13, No. 5, Mar. 3, 1977, page 139.) Later studies concentrated on the effects of intentionally graded single-mode fibers. Such work additionally studied the effect of the relatively prevalent central dip in the index of refraction obtained in certain manufacturing processes. These studies indicated that fibers with an index profile parameter $\alpha \leq 2$ could not be designed with zero dispersion, and furthermore showed that the central dip only exacerbated this problem. (See, for example, A. W. Snyder et al., *Electronics Letters,* Vol. 15, No. 10, May 10, 1979, page 269.) Other studies showed that for $\alpha \leq 2$, zero dispersion could be obtained, but that the contribution to the dispersive characteristics of the fiber associated with waveguide dispersion was essentially zero, and that the zero dispersion point consequently was determined by the zero for material dispersion alone.

SUMMARY OF THE INVENTION

This invention is a graded single-mode fiber with index profile parameter $\alpha \leq 2$. Applicants show that for such fibers, zero total dispersion may be obtained only if both material dispersion and waveguide dispersion are taken into account. The zero total dispersion wavelength occurs at a region removed from the wavelength for zero material dispersion. Further studies indicate that in the vicinity of $\alpha = 2$, the optical radiation is efficiently confined to the core region to an extent not heretofore realized. As a result of this efficient confinement of the electromagnetic radiation, such fibers may be fabricated with cladding-to-core ratios less than that thought necessary in step-index single-mode fibers, i.e., less than 10. Alternatively, fibers with higher cladding-to-core ratios may be fabricated, with improved microbending and curvature loss characteristics. Optimal characteristics for many applications may be obtained with graded index fibers having an associated $\alpha$ in the vicinity of 1.

DETAILED DESCRIPTION

Figure 1:
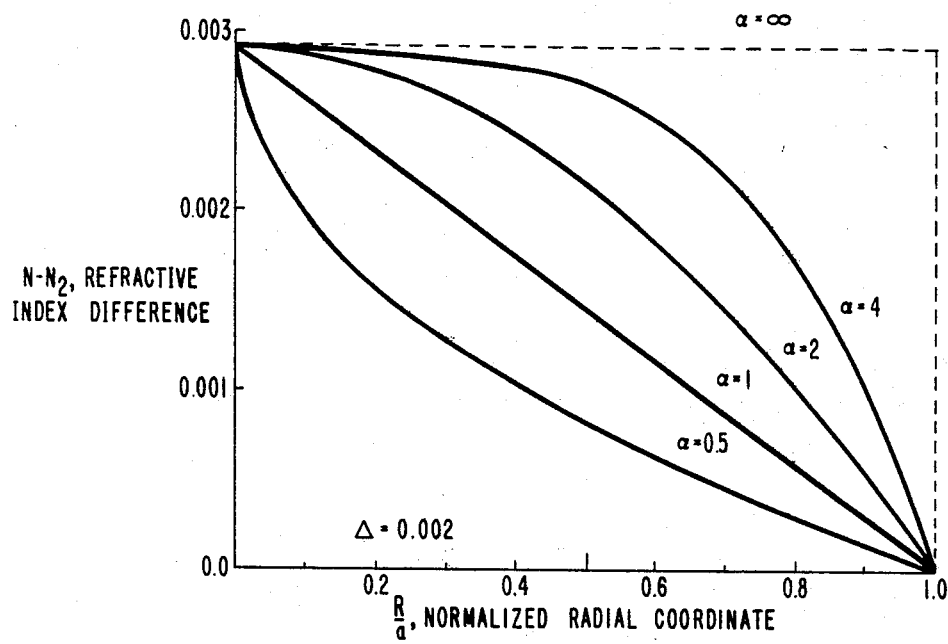
FIG. 1 is a schematic representation of the index distribution in fibers with various values of $\alpha$.

The invention is a graded index single-mode optical fiber with parametric characteristics that result in, among other properties, low total dispersion and improved field confinement.

The fiber is referred to as an optical fiber since material properties will be such that transmission in at least a part of the optical region of the electromagnetic spectrum from 0.6 to 1.7 microns will generally result in signal loss of less than 5 dB/km, and in certain embodiments less than 2, 1 or even 0.5 dB/km. Such low loss generally occurs in the vicinity of $1.3 \pm 0.05$ microns and $1.5 \pm 0.05$ microns.

Consistent with common usage, the fiber is referred to as a single-mode fiber since in the operational wavelength range the fiber will support essentially only a single albeit perhaps degenerate propagation mode. The single-mode characteristic of the fiber is generally defined by a cutoff frequency $$V_c = 2\pi \frac{a}{\lambda} \sqrt{N_1^2 - N_2^2}$$

where a is the radius of the core, $\lambda$ is the wavelength of the light being transmitted, $N_1$ is maximum value of the index of refraction of the core, and $N_2$ is the index of refraction of the cladding. For a step index fiber, $V_c$ is equal to 2.405. For values of $V_c$ greater than 2.405, the fiber will support more than a single mode. It is clear from the wavelength dependence of $V_c$ that reference to a fiber as a single-mode fiber may be viewed as imprecise, insofar as it does not include an operating wavelength. For purposes of precision, various specific embodiments discussed in this application will include specific transmission wavelengths. However, generally speaking, the reference to the fiber as a single-mode fiber should be taken to mean that the fiber is operated at a wavelength where it supports only a single, albeit perhaps degenerate, mode. Various supporting devices, such as sources, detectors, filters and associated circuitry, both optical and electronic, will be designed to operate at the transmission wavelength for which the fiber is a single-mode fiber.

The inventive fiber is referred to as a graded-index single-mode fiber since the behavior of the index of refraction with radial direction varies in a definitely prescribed manner. Prior art step index fibers which were represented as having an essentially uniform index of refraction throughout the core on the one hand, and throughout the cladding on the other hand, with an abrupt change in index of refraction at the core-cladding interface, in reality may not have been perfectly step indexed fibers. Manufacturing processes with associated exposure to various temperatures and concomitant diffusion and volatilization may have resulted in sufficient movement of dopant species to yield detectable gradation in index of refraction. At times the core of the fiber displayed an index dip, and the core-cladding interface, where the index of refraction was to change abruptly, may have shown a continuous change over a finite region of the fiber radius. However, the inventive fiber has an intentionally designed radial gradation in index of refraction which is manufactured into the fiber, and identified by specific values of profile exponent $\alpha$.

The profile exponent, $\alpha$ in terms of which radial gradations in index of refraction may be expressed, is given by the formula $$N(r) = N_1(1 - \Delta r^\alpha)$$

where $N_1$ is the index of refraction at the center of the core, and $\Delta$ is given by the formula $$\Delta = (N_1 - N_2)/N_1$$

where $N_2$ is the index of refraction of the cladding.

FIG. 1 is a plot of the refractive index as a function of the fiber radius for a number of different profile exponents $\alpha$. Clearly, $\alpha = \infty$ defines the classical step index fiber, $\alpha = 2$ defines a fiber with a parabolic variation in index of refraction, and $\alpha = 1$ defines a fiber with what is referred to here as a triangular variation in index of refraction.

Although previous workers had made approximate calculations to determine the effect of unintentional variations in index of refraction in step index single-mode fibers, and had then gone on to calculate the effect of intentional gradations in index of refraction with various values of $\alpha$, applicants have developed a mathematical technique for describing exactly the transmission characteristics of a graded single-mode fiber (G. E. Peterson et al., *The Bell System Technical Journal*, Vol. 59, No. 7, September 1980; U. Paek et al., ibid., Vol. 60, No. 5, May–June 1981, page 583). The technique involves a numerical procedure for obtaining exact solutions to Maxwell's equations. Maxwell's equations are written as four coupled simultaneous first order differential equations. The effective index for the single propagating $HE_{11}$ mode is found by solving the characteristic equation derived from the matching conditions of the field components at the core-cladding interface. The dispersion is then calculated from the effective index. In addition, the conditions under which various other modes propagate as well as other characteristic properties of the single-mode fiber may be derived. The computing procedures do not impose any restrictions on the index profile of the fiber. However, for the sake of simplicity, an $\alpha$ index profile is chosen. In the computation material dispersion is included in the calculation from the onset. The subtle interaction between material properties and waveguide properties determine the propagation characteristics of the lightguide.

Figure 2:
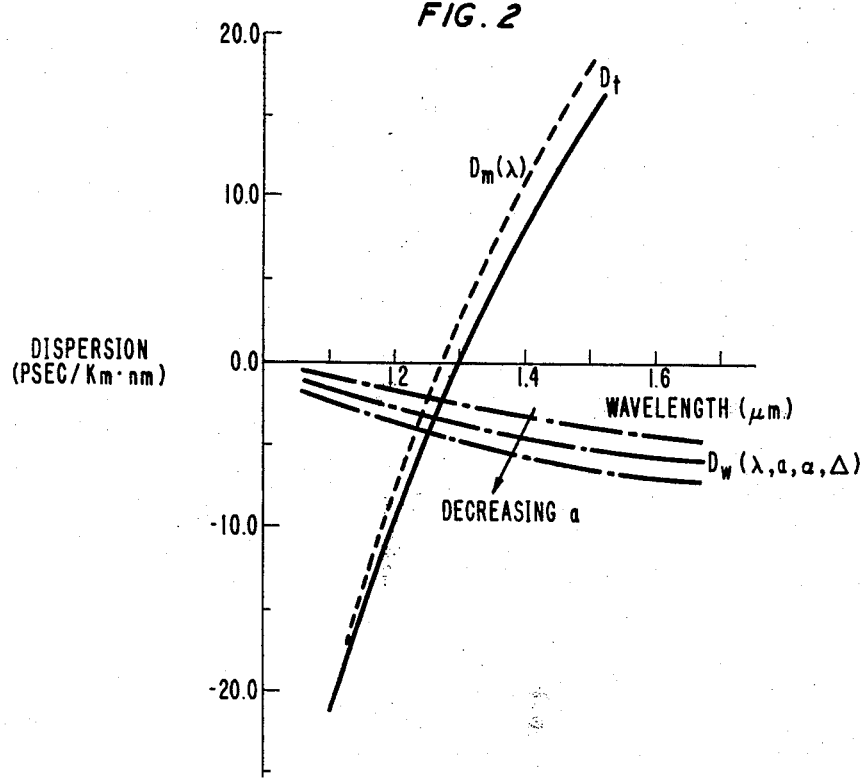
FIG. 2 is a plot of the dispersion characteristics of a graded index single-mode fiber showing how the material and waveguide dispersion combine to yield a total dispersion which reaches zero in the optical region of the spectrum.

FIG. 2 is exemplary of the interaction between the waveguide and material characteristics of the fiber. In this Figure, the dispersion of the fiber is shown as a function of wavelength. It is noted that the total dispersion $D_t$ is the sum of the material dispersion $D_m$ and the waveguide dispersion $D_w$. As noted previously, waveguide dispersion may be associated with different field configurations within the fiber which are dependent on various waveguide parameters. It is noted in FIG. 2 that while the material dispersion characteristics of the fiber are determined by the material characteristics of the fiber, the waveguide dispersion is determined in part by physical characteristics such as the core radius a, as well as by material characteristics of the fiber, such as $\alpha$ and $\Delta$. As the core radius, a, decreases, the waveguide dispersion of the fiber increases in the negative direction. Consequently, by varying, for example, the radius of the core so as to cancel waveguide dispersion against material dispersion, the total dispersion of the fiber may be designed to be zero over a range of wavelengths in the vicinity of, for example, 1.3 microns. In FIG. 2, the total dispersion of the fiber is designed to be zero at 1.3 microns by appropriate selection of waveguide dispersion characteristics.

Further calculation enables the description of the behavior of the cutoff frequency with profile exponent $\alpha$ as well as calculation of the optimum frequency, $V_{opt}$, at which the dispersion of the fiber is zero. The variation of cutoff frequency with profile exponent was previously described in an article by W. A. Gambling et al., which appeared in *Electronic Letters*, Vol. 13, No. 5, on Mar. 3, 1977, at page 139. These authors, however, did not discuss the optimum frequency $V_{opt}$ at which the dispersive characteristics of the fiber vanish. However, A. W. Snyder et al., in an article which appeared in *Electronics Letters*, Vol. 15, No. 10, on May 10, 1979, at page 269, did discuss the behavior of the zero dispersion frequency $V_{opt}$ as a function of $\alpha$ profile. In their article at FIG. 1a, it is shown that the cutoff frequency varies with $\alpha$, as shown here in FIG. 3, and in the previously referenced article by W. A. Gambling et al. However, the zero dispersion frequency shown in the Snyder reference at FIG. 1a goes to $\infty$ for $\alpha \leq 2$ whereas applicants show here in FIG. 3 that for $\alpha \leq 2$, the zero total dispersion frequency is finite. An aspect of applicants' inventive fiber is then the characteristic of zero total dispersion, while $\alpha \leq 2$, combined properties, heretofore unknown in the art. Alternative embodiments include $\alpha$ less than 2 or less than 1.8.

In the inventive fiber, the profile exponent is set less than or even equal to 2, and the other characteristics of the fiber, such as Δ and core radius are adjusted so that the total dispersion associated with the fiber is zero. Clearly, in an actual fiber, the dispersion will never be absolutely zero, but in the inventive fiber, the dispersion will be very small, and for purposes of precision, applicants define a zero dispersion fiber as one with a dispersion of less than 5, 3 or 2 picoseconds per kilometer nanometer.

In an article by W. A. Gambling et al., which appeared in *Electronics Letters*, Vol. 15, No. 15, on July 19, 1979, at page 474, zero dispersion fibers with α less than or equal to 2 are discussed. At FIG. 2, and the paragraph preceding FIG. 2, however, it is clear that this reference envisions such fibers as having dispersive characteristics associated only with material dispersion. These authors assume that for $\alpha \leq 2$, the waveguide dispersion vanished and the "minimum wavelength for zero total dispersion is asymptotic to a value given approximately by the wavelength needed for zero material dispersion of the core material." Applicants, however, have shown that while zero dispersion fibers may be obtained for $\alpha \leq 2$, such low dispersion can be obtained with such values of profile exponents only by continuing to consider the waveguide dispersion as well as the material dispersion. Consequently, in an embodiment of applicants' zero total dispersion fiber with $\alpha \leq 2$, the zero dispersion wavelength is removed from the zero dispersion wavelength which would be calculated based on material dispersion characteristics alone.

Figure 3:
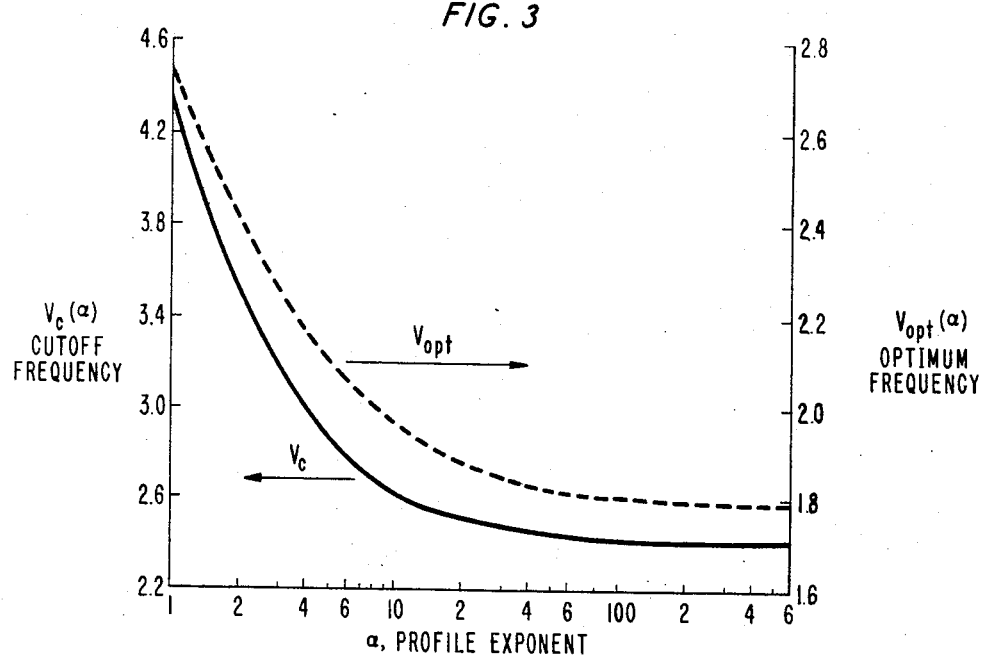
FIG. 3 is a plot of both the cutoff frequency, $V_c$, and the frequency for zero total dispersion, $V_{opt}$, as a function of the profile exponent $\alpha$.
Figure 4:
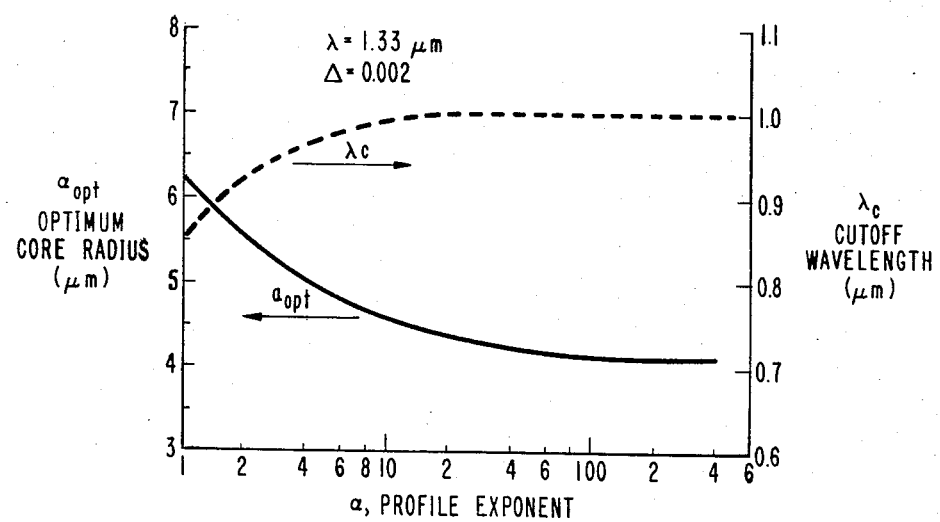
FIG. 4 is a plot of both the cutoff wavelength, $\lambda_c$, and the radius for which the fiber dispersion is zero, $a_{opt}$, as a function of $\alpha$, the profile exponent.

FIG. 4, as supplemental to FIG. 3, is a plot of both the optimum core radius and the cutoff wavelength as a function of profile exponent. To be noted here, once again, is the result that for α values ≤ 2, there does exist an optimum core radius for which the dispersion is zero. This optimum core radius is obtained by considering the dispersive effects of both material dispersion and waveguide dispersion. The optimum core radius at which the total dispersion is zero shows a rapid increase as the profile parameter α drops below 10. For a triangular index profile, $\alpha = 1 \pm 0.2$, the core size for "zero total dispersion" is over 50% larger than the size of a step index core. Such a larger core size without change in Δ and λ yields beneficial effects associated with ease of handling, coupling to the source, and splicing. An alternative embodiment of applicants' invention is then a zero total dispersion fiber with $\alpha = 1 \pm 0.2$.

Figure 5:
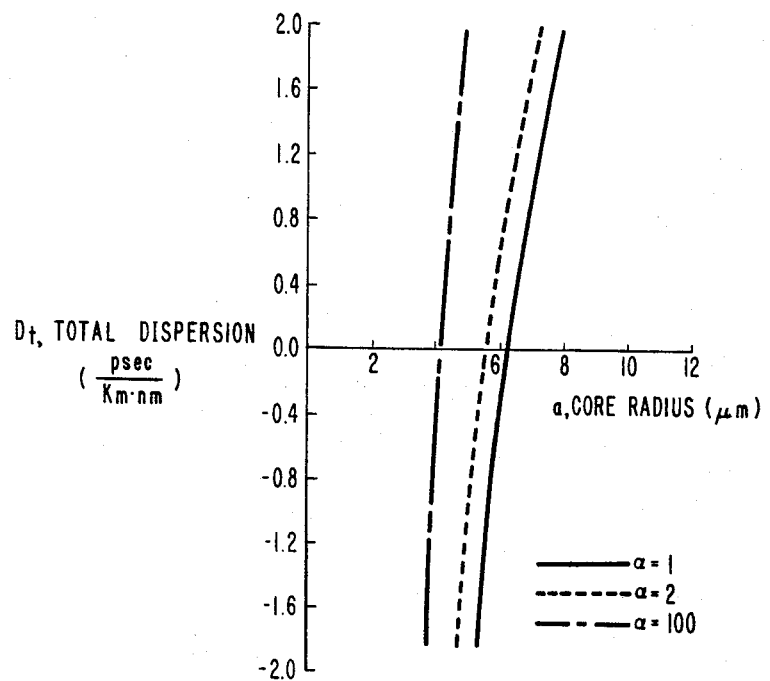
FIG. 5 is a plot of total dispersion as a function of core radius, for fibers with three different profile exponents.

To determine the optimum radius $a_{opt}$ at which the total dispersion is zero, a computer search is done of core radius values less than the cutoff radius. In FIG. 5, results of such a calculation are shown for three α values, namely, 100, 2, and 1. The zero dispersion radii for these α values are 4.142, 5.72 and 6.294 microns, respectively. It should be noted that the total dispersion $D_t$ is most sensitive to radius for $\alpha = 100$ and least sensitive when $\alpha = 1$. Since one consideration in fiber design is ease in manufacturability, clearly the less sensitive variation of total dispersion with core radius is a desirable characteristic from the point of view of manufacture.

Figure 6:
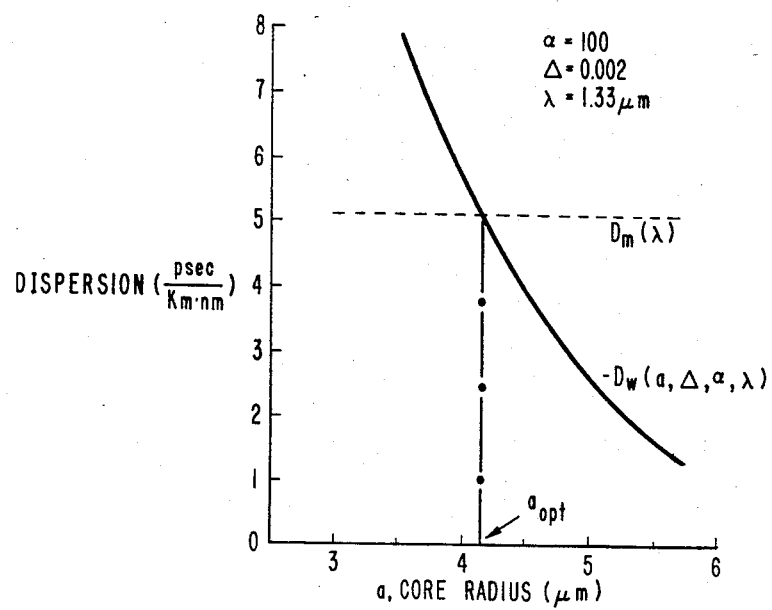
FIG. 6–8 are plots of the dispersion, both material dispersion and waveguide dispersion, for fibers with varying profile exponents $\alpha$, transmitting at a wavelength of 1.33 microns. The dispersion is plotted as a function of core radius, showing in each case an optimum core radius $a_{opt}$ where the dispersion is zero.
Figure 7:
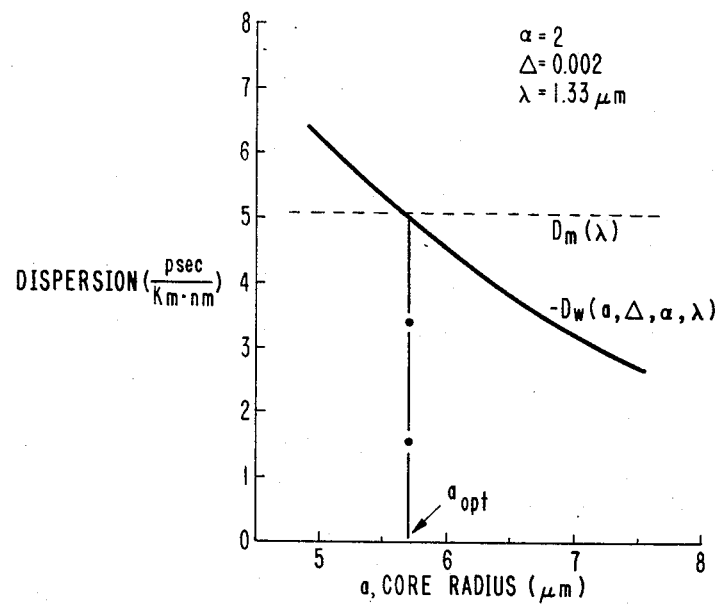
Figure 8:
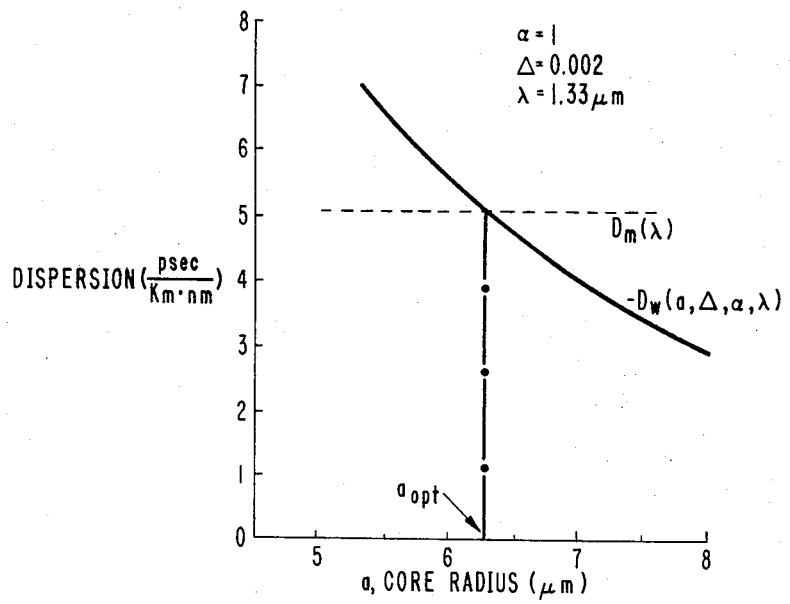

While the numerical procedure simply searches for zero in total dispersion, it has been shown that the total dispersion may be separated, both from a heuristic as well as a calculational point of view, into its component parts $D_m$, the material dispersion, and $D_w$, the waveguide dispersion. In FIGS. 6, 7, and 8, the optimum core radius is calculated using the assumption that the total dispersion is the sum of the material and waveguide dispersions. Each contribution is calculated separately and displayed in these Figures. The results of this approximate calculation agree well with the previous results shown in FIG. 5 which were calculated without assuming that the total dispersion is separable into material and waveguide dispersion contributions.

A serious difficulty with single-mode fibers is associated microbending loss. The microbending loss is due in part to significant transmission of the electromagnetic energy in the cladding of the single mode fiber. As a result, step-index, single-mode fibers usually have large claddings and large cladding-to-core ratios in order to avoid loss of electromagnetic energy from the cladding as a result of, for example, microbending.

Figure 9:
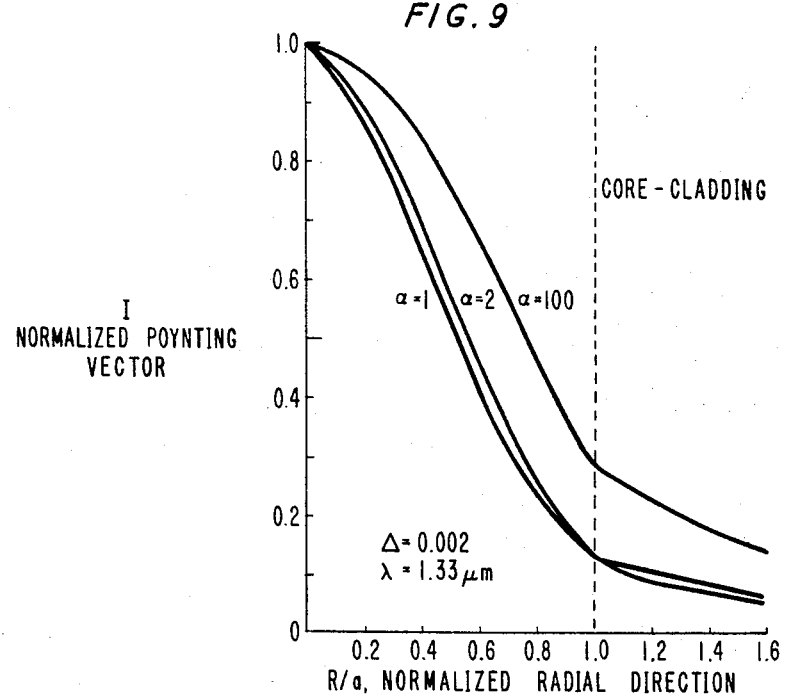
FIG. 9 is a plot of the normalized Poynting vector as a function of the normalized radial direction.

Alternatively, however, design of the single-mode fiber may be varied so as to prevent the field of the fundamental mode from extending well into the cladding. For example, the electromagnetic field may be tightly confined to the core by increasing Δ or by changing the index profile of the core. Using the calculational method developed by applicants, the field distribution within the cladding was studied as a function of profile exponent α. The amount of energy flowing through the fiber was calculated from the Poynting vector. In FIG. 9, the Poynting vector, normalized to the value at the core center, is plotted as a function of normalized radial direction for three different α values. It is shown that the normalized Poynting vectors falls off more rapidly with lower α values.

While the power distribution is largely dependent on the index profile, to quantify the focusing power or confinement of a lightguide, we introduce a parameter φ which we define as the confinement ratio of a lightguide. It represents the degree of power confined to the core with respect to the total propagating power. This ratio reaches its peak very near $\alpha = 2$. A slightly larger value of α occurs if the profile is Gaussian. Both the Gaussian index profile and the $\alpha = 2$ profile yield an approximately 40% increase in φ over the step index profile case. The significance of this lies in that it may help to eliminate microbending losses in single-mode fibers without increasing Δ. With $\alpha = 1$, this ratio is increased approximately 23% over the value of $\alpha = \phi$, i.e., the step index value.

Figure 10:
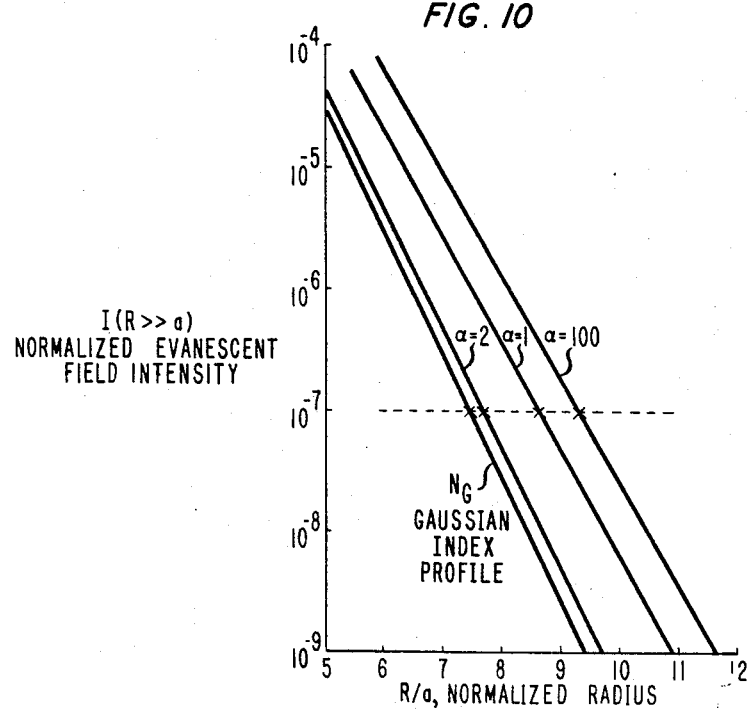
FIG. 10 is a plot of the normalized field intensity within the fiber cladding as a function of the normalized radius for various values of $\alpha$, the profile exponent.

In the design and the fabrication of step-index single-mode fibers, it has been customary to fix the core-clad ratio at approximately 0.1. The large cladding was thought to be required to avoid loss of the transmitting mode through the cladding. Applicants, however, come to a surprisingly different conclusion after studying the evanescent field within the cladding for graded index fibers. In FIG. 10 is displayed the normalized evanescent field intensity as a function of the normalized fiber radius. In order to compare the core-to-clad ratios for different values of α, applicants define an intensity level within the cladding equal to $10^{-7}$ as the cladding cutoff point. (The core radius, a, is defined by the previous equations for N(r) and Δ and is generally from 1.5–1.0 or 4–5 microns. The total fiber diameter is 50 to 300 or 110 to 125 microns.) This corresponds to a clad-to-core ratio of 9.3 for $\alpha = 200$, which is approximately consistent with the practice in the art to use a clad-to-core ratio of approximately 10 for step index fibers. However, as α decreases from 100 to 2, the clad-to-core ratio decreases from 9.3 to 7.6. The value for the Gaussian profile is very close to that for $\alpha = 2$. It is observed from our calculated results that the field confinement in the core reaches its maximum value near $\alpha = 2$. For a parabolic or Gaussian profile, the field confinement is approximately 40% larger than that of a step index core. We previously indicated that the optimum core size increases with decreasing $\alpha$ value. A triangular fiber with $\alpha=1$ provides an optimum core size which is over 50% larger than that of a step index core. However, attempts to increase the field confinement by increasing $\Delta$ while keeping the core radius fixed may move the cutoff rather close to the operating wavelength. Our work indicates, however, instead of increasing $\Delta$ it may be possible to obtain improved field confinement and lower clad-to-core ratios by decreasing the value of $\alpha$. An aspect of applicants' invention may then include core-to-clad ratios less than 10, 9 or 8. In alternative embodiments, the graded index cores may be combined with a "w type" double cladding.

EXAMPLE 1

An inventive zero dispersion graded index single-mode fiber may be fabricated using the MCVD technique. Several fluorine and phosphorus-doped silica cladding layers may first be deposited on the interior of a 16×20 mm diameter silica substrate tube to match the deposited cladding index to silica. A number of exemplary germanium-doped core layers may then be doped with a predetermined germanium tetrachloride flow to achieve a particular value of $\alpha$. Tube collapse is advantageously carried out with a small flow of germanium tetrachloride and oxygen to reduce the center index dip. The preform may be drawn in an exemplary zirconia induction furnace. Exemplary drawing temperatures of 2100° C. may be used and the fiber may be in-line coated with an appropriate resin. In this example, the fiber has an $\alpha=1$, a core diameter of 9.5 microns, and a cladding-to-core ratio of 6.2. The index difference $\Delta$ is 0.0075 and the measured zero chromatic dispersion wavelength $\lambda_0$ is equal to 1.402 microns.

EXAMPLE II

A fiber fabricated as in Example 1 has an $\alpha$ of 1.8 and a clad-to-core ratio of less than 8.

EXAMPLES III–IV

Fibers fabricated as in Examples I and II have w-type double cladding to obtain zero dispersion over an extended wavelength range.

What is claimed is:

1. An optical fiber comprising a core with a graded index of refraction given substantially by a profile exponent $\alpha \leqq 2$ and a cladding,
   the $\Delta$ index of refraction of the core, core radius, and profile exponent $\alpha$ of the core being such that
   (a) the fiber supports essentially only one propagating mode in the wavelength range of 0.6–1.7 microns;
   (b) the fiber has a total dispersion <5 psec/Km.nm in at least a part of the spectral region from 0.6–1.7 microns;
   (c) the total dispersion associated with the fiber is the sum of at least a nonzero waveguide dispersion and a nonzero material dispersion; and
   (d) the wavelength at which the total dispersion is minimized is different than the zero material dispersion wavelength.
2. The fiber of claim 1 where $\alpha < 2$.
3. The fiber of claim 2 where $\alpha < 1.8$.
4. The fiber of claim 3 where $\alpha$ is $1.0 \pm 0.2$.
5. The fiber of any of claims 1 through 4 where the clad-to-core ratio is less than 10.
6. The fiber of claim 5 where the clad-to-core ratio is less than 9.3.
7. The fiber of claim 5 where the clad-to-core ratio is less than 9.
8. The fiber of claim 5 where the clad-to-core ratio is less than 8.
9. The fiber of claim 5 where the cladding comprises two regions with different characteristics indices of refraction, profile exponents or both.

* * * * *

UNITED STATES PATENT AND TRADEMARK OFFICE
CERTIFICATE OF CORRECTION

PATENT NO. : 4,412,722

DATED : November 1, 1983

INVENTOR(S) : Anthony Carnevale, Un-Chul Paek and George E. Peterson

It is certified that error appears in the above-identified patent and that said Letters Patent is hereby corrected as shown below:

Column 8, line 43, "$\phi$" should read --100--.

Signed and Sealed this

Fifth Day of June 1984

[SEAL]

Attest:

GERALD J. MOSSINGHOFF

Attesting Officer

Commissioner of Patents and Trademarks